UNITED STATES PATENT OFFICE.

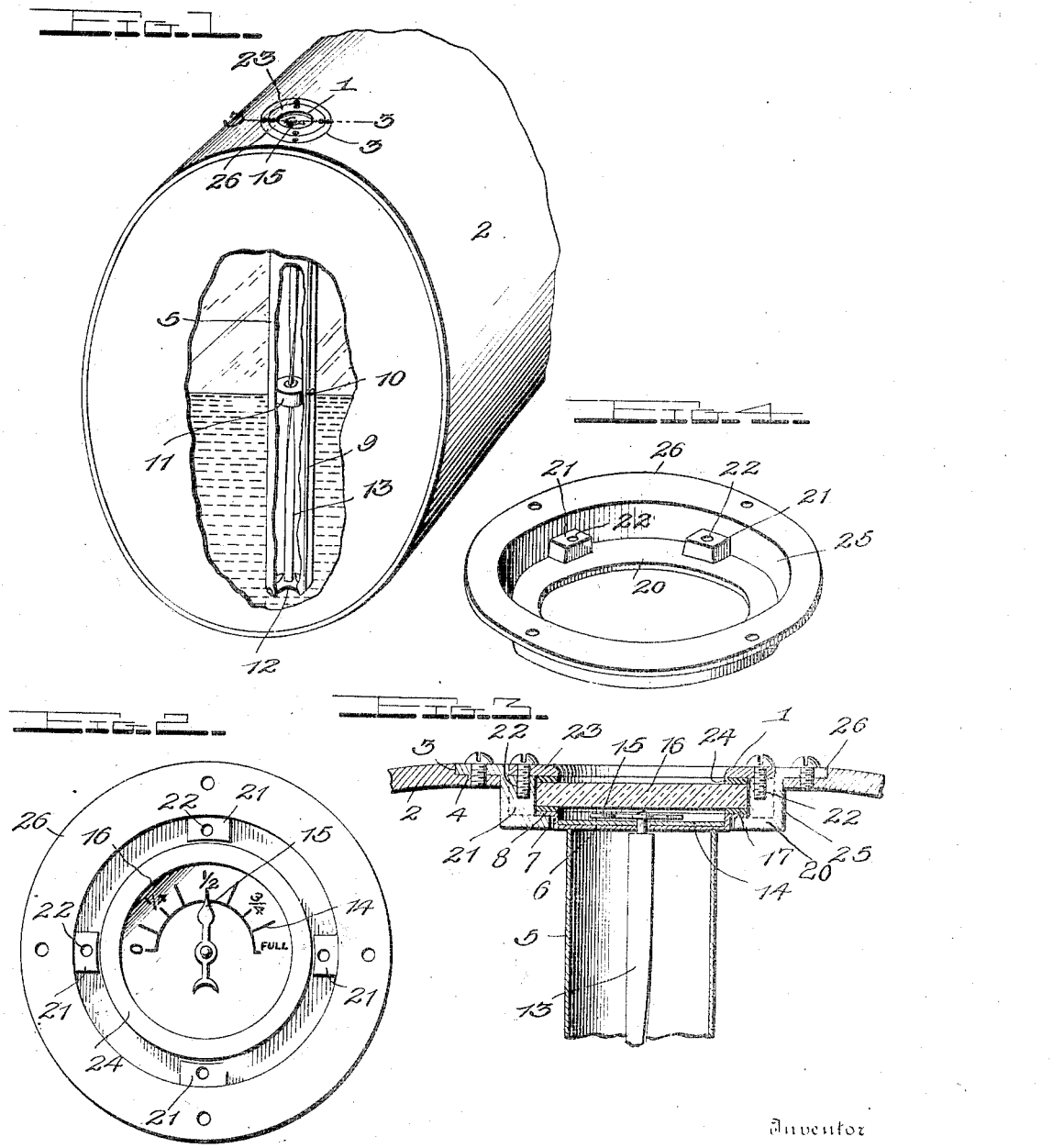

FREDERICK L. PFAHL, OF AKRON, OHIO.

GASOLENE-GAGE STRUCTURE.

1,098,968. Specification of Letters Patent. Patented June 2, 1914.

Application filed May 26, 1913. Serial No. 770,001.

*To all whom it may concern:*

Be it known that I, FREDERICK L. PFAHL, a citizen of the United States, residing at Akron, in the county of Summit and State of Ohio, have invented certain new and useful Improvements in Gasolene-Gage Structures; and I do declare the following to be a full, clear, and exact description of the invention, such as will enable others skilled in the art to which it appertains to make and use the same.

This invention relates to improvements in indicators for liquid containing tanks or vessels.

The main object of the invention is to provide a mounting for an indicator of this character in which the indicating dial is exposed and the mounting arranged on the outer face of the tank to which the indicator is applied.

Another object of the invention is to provide simple and efficient means for centering and supporting the indicator.

With these and other objects in view, the invention consists of certain novel features of construction, and the combination and arrangement of parts as will be more fully described and claimed.

In the accompanying drawings: Figure 1 represents a perspective view of a portion of a tank with this improved indicator applied, parts being broken out; Fig. 2 is a plan view with the outer clamping band removed; Fig. 3 is a transverse vertical section thereof taken on the line 3—3 of Fig. 1; Fig. 4 is a perspective view of the annular supporting member of the mounting detached.

In the embodiment illustrated 1 denotes the indicator to which this improvement is applied and 2 denotes the tank within which the indicator is mounted. The tank 2 as shown is cylindrically formed but it is obvious that the gage may be applied to any style of tank. This tank 2 has an opening 3 in its upper face to receive the mounting which supports the indicator, said opening being shouldered to form a supporting flange 4 on which the flange of the dial cup or indicator support is designed to be seated as will be hereinafter described, the outer face of the flange of said support being thus arranged flush with the outer face of the tank.

The indicator 1 as shown comprises a float guiding tube 5 which is secured to the under side 6 of a dial supporting cup 7, said cup having on its outer edge an annular radially projecting flange 8. The float guiding tube 5 has a longitudinally extending slot 9 through which projects a radial finger 10 on the float 11 arranged within the tube 5, said finger being slidably engaged with said slot whereby the float is held against rotation but is permitted to freely rise and fall within the tube with the rising and falling of the liquid in the tank 2.

A skeleton bearing plate 12 is secured to the lower end of the tube 5 and an upwardly projecting float operated shaft 13 is revolubly mounted in said plate 12 and the upper end thereof projects through the bottom 6 of cup 7 and the dial 14 mounted in said cup. On the upper end of the shaft 13 is fixedly mounted an indicating finger or pointer 15 which is adapted to co-act with the scale on the dial plate. The shaft 13 is preferably rectangular in cross section and is twisted so that the sides and corners thereof are in spiral form. The float 11 has a centrally disposed rectangular passage which is slidably engaged with the shaft 13 so that the rising and lowering of the float will revolve the shaft 13 by reason of its spiral formation and the sliding engagement of the float therewith. When the shaft 13 is thus operated the pointer 15 will be revolved in one direction or the other and will co-act with the scale on the dial plate to indicate the quantity of liquid in the tank.

A transparent plate 16 covers the dial 14 and the periphery thereof extends flush with the periphery of the radial flange 8, said plate resting on said flange preferably having a gasket 17 arranged between the plate and said flange.

The indicator mounting or support comprises an annular plate 20 provided on its upper face with a plurality of spaced centering lugs 21 arranged adjacent the periphery of said plate and spaced from the inner edge thereof a distance equal to the width of the flange 8 on the dial cup 6, said flange 8 being adapted to rest on said plate 20 and be held against lateral movement by the centering lugs 21. These lugs 21 are provided with screw threaded sockets 22 opening through the upper ends thereof which are designed to receive the fastening screws which secure an annular clamping plate 23 in position for holding the cover 16 reliably between said plate 23 and the plate 20, a gasket 24 being preferably arranged between the plate 23 and the glass disk or plate 16.

The plate 20 is provided at its periphery with an upstanding collar 25, from the edge of which extends an annular radial flange 26 which is designed to rest on the annular shoulder formed around the opening 3 in the tank 2, said flange 26 being of a width corresponding to the width of the shoulder and the circumference of the collar 25 corresponding to the circumference of the inner edge of said shoulder whereby said collar 25 is fitted closely within the tank opening. After the indicator 1 has been inserted in the supporting plate 20 and secured thereto by the clamping plate 23, the plate 20 with the indicator attached is mounted on the tank 2, the indicator being first inserted through the opening in said tank and the flange 26 of said plate is secured to the shoulder around the opening 3 by means of fastening screws or other suitable elements. When the parts are thus assembled it will be obvious that the outer faces of the flange 26 and the plate 23 will be flush with each other and with the outer face of the tank 2 and that the indicator will be reliably supported within the tank and held by the centering lugs 21 against lateral movement.

While I have described my invention with more or less minuteness as regards details and as being embodied in certain precise forms, I do not desire to be limited thereto unduly any more than is pointed out in the claims. On the contrary, I contemplate all proper changes in form, construction and arrangement, the omission of immaterial elements and substitution of equivalents as circumstances may suggest or render expedient.

I claim as my invention:

1. An indicator support comprising an annular plate having an inner edge, centering means spaced from said inner edge, an upstanding collar at the periphery of said plate, with a lateral flange extending radially from said upstanding collar.

2. An indicator support comprising an annular plate having an inner edge, centering lugs spaced from said inner edge, an upstanding collar at the periphery of said plate extending above the upper ends of said lugs, a clamping plate fitted within said upstanding collar and resting on said lugs, means for securing said clamping plate to said lugs, and a flange extending laterally from the upper edge of the said upstanding collar with its upper face flush with the upper face of the clamping plate.

3. The combination with a liquid containing tank having an aperture therein for the reception of a gage, a collar fitted in said opening and having an annular plate extending inwardly therefrom, a dial supporting cup seated on said plate, a tube secured to and depending from said cup, a float slidably located in said tube, means for preventing rotation of said float, a plate at the lower end of said tube, a shaft journaled in the supporting cup and in the plate at the lower end of said tube, said shaft passing through the float and coöperating therewith, whereby the shaft is rotated during the vertical travel of the float, a pointer carried by the upper projecting end of the shaft, a transparent cover for said supporting cup, and means for holding said transparent cover and supporting cup on said ledge.

In testimony whereof I have hereunto set my hand in presence of two subscribing witnesses.

FREDERICK L. PFAHL.

Witnesses:
E. E. OTIS,
L. R. BARNES.